US012588671B2

(12) United States Patent
Hemmerle et al.

(10) Patent No.: US 12,588,671 B2
(45) Date of Patent: Mar. 31, 2026

(54) METHOD FOR CALIBRATING AN AGRICULTURAL SPRAYER

(71) Applicant: EXEL INDUSTRIES, Epernay (FR)

(72) Inventors: Matthieu Hemmerle, Epernay (FR); Jérôme Dias, Lyons (FR)

(73) Assignee: EXEL INDUSTRIES, Epernay (FR)

( * ) Notice: Subject to any disclaimer, the term of this patent is extended or adjusted under 35 U.S.C. 154(b) by 148 days.

(21) Appl. No.: 18/488,703

(22) Filed: Oct. 17, 2023

(65) Prior Publication Data

US 2024/0130348 A1 Apr. 25, 2024
US 2024/0224976 A9 Jul. 11, 2024

(30) Foreign Application Priority Data

Oct. 19, 2022 (FR) ...................................... 2210784

(51) Int. Cl.
 *A01M 7/00* (2006.01)
 *B05B 12/12* (2006.01)
(52) U.S. Cl.
 CPC ......... *A01M 7/0089* (2013.01); *B05B 12/122* (2013.01)
(58) Field of Classification Search
 CPC ........................... A01M 7/0089; B05B 12/122
 USPC ........................................................ 701/50
 See application file for complete search history.

(56) References Cited

U.S. PATENT DOCUMENTS

| | | | |
|---|---|---|---|
| 2020/0072809 A1* | 3/2020 | Bhanu | ................... G01N 29/036 |
| 2022/0138464 A1* | 5/2022 | Kwak | ........................ B05B 1/20 |
| | | | 239/1 |
| 2022/0192084 A1* | 6/2022 | Mizushima | ......... A01M 7/0089 |
| 2022/0256832 A1* | 8/2022 | Serrat | ...................... B05B 12/16 |
| 2025/0017192 A1* | 1/2025 | Humpal | .............. A01M 7/0089 |

FOREIGN PATENT DOCUMENTS

WO 20190226869 A1 11/2019

OTHER PUBLICATIONS

Search Report from the French Intellectual Property Office on corresponding FR application (FR2210784) dated Apr. 26, 2023.

* cited by examiner

*Primary Examiner* — Mahmoud S Ismail
(74) *Attorney, Agent, or Firm* — Alumen IP Law PC

(57) ABSTRACT

The present invention relates to a method for calibrating an agricultural spraying machine comprising a plurality of spray nozzles arranged on the spray boom, at least one optical sensor and a control system, each optical sensor of said at least one optical sensor having a field of view comprising sectors, each of the sectors being associated with a spray nozzle, the control system being configured to control the plurality of spray nozzles as a function of images acquired by the optical sensors, the calibration method comprising, for an optical sensor, an automatic association implemented by the control system of each sector of the field of view of the corresponding optical sensor with a spray nozzle of the plurality of spray nozzles.

18 Claims, 2 Drawing Sheets

METHOD FOR CALIBRATING AN AGRICULTURAL SPRAYER

CROSS-REFERENCE TO RELATED APPLICATION

This regular U.S. utility application claims priority to French application No. FR2210784, filed Oct. 19, 2022.

TECHNICAL FIELD

The present invention relates to the field of agricultural spraying machinery, notably for spraying a plant protection product in a localized manner on crops. In particular, the present invention relates to the field of calibration of such agricultural spraying machinery.

BACKGROUND

The aim of the agricultural spraying of products is to optimize the growth of crops, for example by promoting growth thanks to the supply of nutrients, by protecting crops from diseases, from parasites, or instead by limiting the spread of "harmful" plants, in other words weeds. A current trend in the field of agricultural spraying is to develop targeted spraying techniques, such that the product can only be sprayed in the areas that require it. This makes it possible, on the one hand, to avoid product waste and, on the other hand, to limit pollution of the soil and the surrounding atmosphere.

Generally speaking, an agricultural spraying machine comprises a spray boom supporting a plurality of spray nozzles configured to project a plant protection liquid in order to treat crops. A tank of the agricultural spraying machine supplies the spraying nozzles via a hydraulic circuit comprising at least one pump, and a set of valves. The control of the valves, or other means of adjusting the circulation of the plant protection liquid, makes it possible to activate, deactivate and adjust the projection of the liquid through the spray nozzles, so as to carry out localized spraying.

In addition, the agricultural spraying machine may comprise a suitable control system to control the spray nozzles from real-time data of the area to be treated, for example data on the distribution, extent, and height of the plants to be treated.

More precisely, cameras mounted on the agricultural machine, for example installed along the spray boom, are able to capture images of the area to be treated. To do so, the field of view of the cameras must at least cover the potential spray field of the nozzles. The control system will then be able to adapt in real time different spraying parameters, such as the flow rate, the type of jets, or the spraying height, based on the processing of the images acquired by the cameras. By way of example, the document FR3093620A1 describes such an agricultural spraying machine.

In addition, such an agricultural spraying machine needs to be precisely calibrated so that the control of the spraying is in return sufficiently precise and responsive. More precisely, the term calibration is taken to mean the relationship between the field of view of the cameras and the field of application of the product by the spray nozzles. In the prior art, this calibration is performed manually at the factory, and thus generally in a static manner and indoors in a limited space. There thus exists a need to simplify the calibration of the agricultural spraying machine.

For this purpose, the present invention proposes a calibration method, which is simpler and faster to implement, in particular by providing the possibility of automating at least certain steps of the method for calibrating the agricultural spraying machine.

SUMMARY OF THE INVENTION

More precisely, to this end, the subject matter of the invention is a calibration method of an agricultural spraying machine comprising a spraying system comprising a spray boom, a plurality of spray nozzles arranged on the spray boom, at least one optical sensor and a control system, each optical sensor having a field of view comprising sectors forming a grid, each cell of the grid of each sector being associated with a spray nozzle of the plurality of spray nozzles, each of the spray nozzles being able to be associated with one or more cells of the grid, the control system being configured to process acquired images of the field of view of said at least one optical sensor and to control the plurality of spray nozzles as a function of said images, the calibration method comprising, for an optical sensor of said at least one optical sensor, an automatic association implemented by the control system of each sector of the field of view of the corresponding optical sensor with a spray nozzle of the plurality of spray nozzles.

Advantageously, for each optical sensor of said at least one optical sensor, performing the following successive steps:

the placing of a ground reference system in the field of view of the corresponding optical sensor, the reference system having a plurality of patterns, each of the patterns being associated with a spray nozzle of said plurality of spray nozzles and corresponding to a shifted position of the corresponding spray nozzle;

the acquisition by the corresponding optical sensor of an image of said field of view integrating said plurality of patterns;

the automatic association implemented by the control system comprising the detection of said plurality of patterns on said image, followed by the association of each of the sectors of the field of view with a spray nozzle of said plurality of spray nozzles when the corresponding sector at least partially integrates the pattern associated with the corresponding spray nozzle.

Advantageously, the reference system being a physical system, notably a tarpaulin, the placing of the reference system comprises the placing of the physical system at a given distance from the spray boom by an operator.

According to one embodiment, the physical system is a tarpaulin, and the automatic association implemented by the control system for the corresponding optical sensor, comprises the detection of the contour of the tarpaulin prior to the detection of said plurality of patterns of the reference system on said image of the field of view of the corresponding optical sensor.

In particular, the agricultural spraying machine may comprise at least one light source; in this case, the implementation of the reference system may comprise the projection of the plurality of patterns by said at least one light source onto the ground, said plurality of patterns corresponding to light patterns.

According to one embodiment, the projection of the plurality of patterns by said at least one light source onto the ground comprises the projection of linear-type light patterns.

Advantageously, the calibration method may be performed for each of the optical sensors of a plurality of optical sensors.

Advantageously, the calibration method may be performed for only one optical sensor of the plurality of optical sensors, notably following an identification of an incorrect adjustment associated with the corresponding optical sensor.

According to one embodiment, the calibration method comprises the automatic identification by the control system of an incorrect adjustment associated with an optical sensor of the plurality of optical sensors, prior to the automatic association implemented by the control system for the corresponding optical sensor.

The calibration method according to the invention may comprise the verification of the coverage of fields of view of two consecutive optical sensors of the plurality of optical sensors, prior to the automatic association implemented by the control system for the corresponding optical sensor.

According to one embodiment, a pattern associated with a spray nozzle extends at least partially into the field of view of at least two adjacent optical sensors. This makes it possible to detect a possible incorrect adjustment of an optical sensor.

The present invention also relates to an agricultural spraying machine comprising a spraying system comprising a spray boom, a plurality of spray nozzles arranged on the spray boom, at least one optical sensor, and a control system, each optical sensor of said at least one optical sensor having a field of view comprising sectors forming a grid, each cell of the grid of each sector being associated with a spray nozzle of the plurality of spray nozzles, each of the spray nozzles being able to be associated with one or more cells of the grid, the control system being configured to process acquired images of the field of view of said at least one optical sensor and to control the plurality of spray nozzles as a function of said images, the control system being configured to carry out, for an optical sensor of said at least one optical sensor, an automatic association between each sector of the field of view of the corresponding optical sensor and a spray nozzle of the plurality of spray nozzles.

Such an agricultural spraying machine may comprise at least one light source configured to project light patterns onto the ground.

According to one embodiment, such an agricultural spraying machine has a light source comprising a concentration device configured to focus the light emitted by the light source.

BRIEF DESCRIPTION OF THE DRAWINGS

The invention will be better understood upon reading the following description, given solely as an example, and by referring to the accompanying figures, given as non-limiting examples, wherein identical references are given to similar objects and in which.

It should be noted that the figures disclose the invention in detail in order to enable the implementation of the invention; although non limiting, said figures are especially used to better define the invention where applicable.

DETAILED DESCRIPTION OF THE INVENTION

According to one aspect of the invention, the invention relates to an agricultural spraying machine, notably a sprayer configured to spread a product, for example a plant protection liquid, in the open field. The invention also pertains to a method for calibrating the agricultural spraying machine according to this aspect of the invention.

In particular, the agricultural spraying machine according to the invention is configured to spread a product in a localized manner on crops, in order to optimize the growth of said crops, for example by promoting growth thanks to the supply of nutrients, by protecting them from diseases, from parasites, or instead by limiting the spread of "harmful" plants, in other words weeds. The agricultural machine may be a self-propelled or towed vehicle. In addition, the agricultural spraying machine may be autonomous, i.e. controlled remotely, or comprise a cabin accommodating a user to drive the machine.

Figure 1:
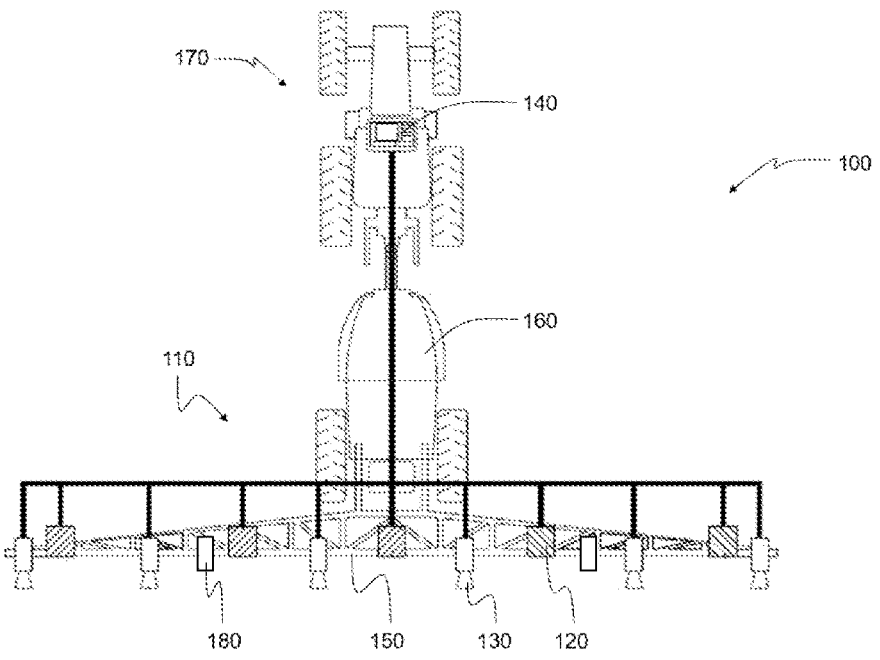
FIG. 1 is a schematic representation of a top view of an example of agricultural spraying machine according to one embodiment of the invention.
Figure 2:
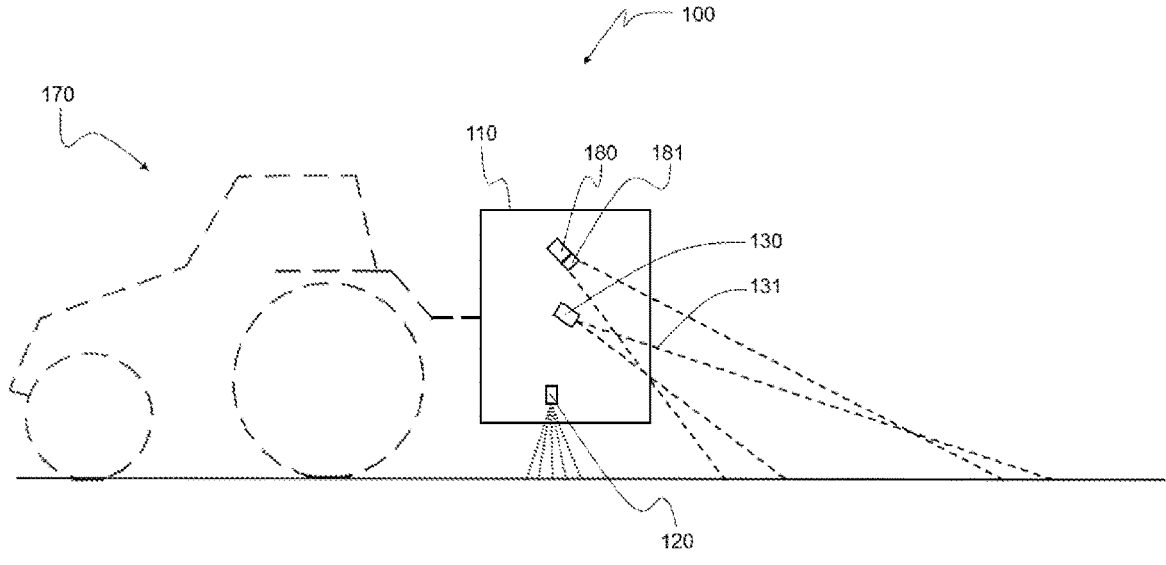
FIG. 2 is a schematic representation of a side view of a spraying system according to one embodiment of the invention.

FIGS. 1 and 2 schematically illustrate the agricultural spraying machine 100 according to the invention, respectively according to a top view and a side view of the agricultural spraying machine 100. The agricultural spraying machine 100 comprises a spraying system 110 comprising a spray boom 150, and a plurality of spray nozzles 120 arranged on the spray boom 150. The spray boom 150 may have a width of several meters to a several tens of meters.

The spray nozzles 120 may be arranged individually, or grouped into assemblies, for example from two to four nozzles, called multi-nozzle assemblies. The multi-nozzle assemblies may be controlled individually or as a group. The use of multi-nozzle assemblies makes it possible to fine tune the adaptation of the spraying to the crops to be treated. In addition, the spray nozzles 120 or, where applicable, the multi-nozzle assemblies, may be laid out in a substantially regular manner along the spray boom, for example every 20 cm to 30 cm.

The agricultural spraying machine 100 may in particular comprise a tractor 170 configured to tow the spraying system 110. Then, the spray boom 150 is preferably positioned at the rear of the tractor 170, but may alternatively be positioned at the front of the tractor 170, if this is appropriate. The terms rear and front are defined here with respect to the forward direction of the tractor 170.

A tank 160 of the spraying machine 100 may notably supply the spray nozzles 120 with product via a hydraulic circuit comprising at least one pump, and a set of valves. Valves, for example compressed air or electric, may be arranged at the level of the spray nozzles 120. The control of the valves enables the activation, the deactivation, and the adjustment of the spraying of the liquid through the spray nozzles, so as to carry out localized spraying.

The agricultural spraying machine 100 according to the invention also comprises at least one optical sensor 130, preferably a plurality of optical sensors, and a control system 140 configured to process images acquired by said at least one optical sensor 130 and to control the spray nozzles 120 as a function of said images acquired by said at least one optical sensor 130. In particular, the images acquired by an optical sensor 130 may be used to control the spray nozzles or, where applicable, the multi-nozzle assemblies as described previously.

The optical sensors 130 will be able to perform real-time acquisition of images covering the potential spray field of the spray nozzles, upstream of the nozzles, so as to allow real-time analysis of the plot to be treated before starting spraying. In other words, said images correspond to an acquisition at a given instant of the field of view 131 of the optical sensors 130. Next, these images will then be able to be transmitted to the control system 140, notably via a communication network. The control system 140 will be able to process said images so as to extract therefrom for example data on the distribution, extent, and height of the plants to be treated. Then, the control system will be able to adapt in real time different spray parameters, such as the spray nozzles to be activated (i.e. the spray nozzles to be controlled to open or close, the other spray nozzles being able to maintain their current state), the spray flow rate, the spray duration, the type of jets to project, or instead the spray height, as a function of the images acquired by the optical sensors. Thus, the control system allows selective spraying so as to target particular areas to be treated, and to adapt the spraying parameters as a function of the characteristics of the plants in these areas to be treated.

Figure 3:
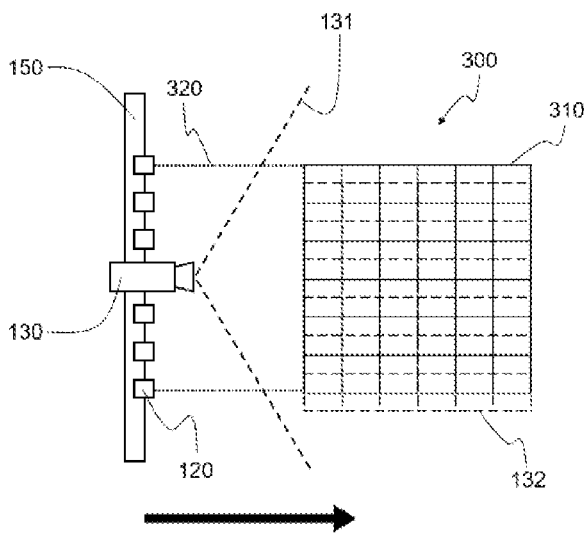
FIG. 3 is a schematic representation of a top view of the spraying system according to one embodiment of the invention.

FIG. 3 schematically represents a top view of the spray system as previously described, focused only on a portion of the spray boom 150 around an optical sensor 130 for the sake of simplification. The field of view 131 of the corresponding optical sensor 130 is represented by dashed lines. It may be noted that the field of view 131 of the optical sensor 130 may be wider than the spray area covered by the spray nozzles 120 associated with this optical sensor 130. Thus, it is possible to have a lateral overlap area between the fields of view of adjacent optical sensors.

In addition, the field of view 131 of the optical sensor 130 comprises sectors 132. Each of the sectors 132 is associated with one of the spray nozzles 120 or, where applicable, with a multi-nozzle assembly. In addition, each of the spray nozzles 120 or, where applicable, a multi-nozzle assembly, may be associated with several sectors 132 of the field of view 131 of the corresponding optical sensor 130. The sectors 132 may, preferably, form a grid (represented by dashes in FIG. 3), each of the cells of the grid being associated with one of the spray nozzles 120 (or, where applicable, a multi-nozzle assembly) associated with the corresponding optical sensor 130. Each of the spray nozzles 120 may be associated with one or more cells of the grid. Then, when the control system 140 detects on one of the sectors 132 the need to spray product, the control system controls the spray nozzle 120 corresponding to this sector 132 in order to spray product on the area of the plot to be treated corresponding to this sector 132.

Further, on the one hand, the control system 140 may comprise a first control unit configured to process images supplied by the optical sensors 130. For this purpose, the first control unit may be configured to implement image processing algorithms. In addition, the first control unit may also be configured to adapt parameters of the optical sensors, namely for example the exposure time and the amplification gain, notably as a function of the exposure, in order to improve the quality of the acquired images.

On the other hand, the control system 140 may comprise a second control unit configured to control the spray nozzles 120. In particular, the second control unit may selectively control the opening of the spray nozzles, when a treatment is required on a given sector, and their closing when said area has passed.

The optical sensors 130 may notably be DBC (Dual Band Captor) cameras or spectral cameras.

The optical sensors 130 are notably fitted on the agricultural spraying machine 100, in particular on the spray boom 150. The optical sensors 130 may be installed in a substantially regular manner along the spray boom 150, while ensuring that the fields of view 131 of adjacent optical sensors 130 have an overlapping area, or at least are contiguous.

In addition, the optical sensors 130 may also be installed at the front of the agricultural spraying machine. Alternatively, one part of the optical sensors 130 may be arranged on the spray boom 150, and another part of the optical sensors 130 may be arranged on the front of the agricultural spraying machine 100, for example on the tractor 170. Arranging one part of the optical sensors 130 at the front of the agricultural spraying machine 100 advantageously makes it possible to respond to the problem of the presence of the tractor which constitutes an obstacle to the desired visual field of the plot to be treated.

The choice of the number of optical sensors 130 used may be based on a compromise between the range of the optical sensors and the precision of the acquired images. The optical sensors may notably consist of so-called low density cameras, for example positioned approximately every three meters along the spray boom, or instead so-called high density cameras, for example positioned approximately every meter along the spray boom. It is also possible to use a combination of low density cameras and high density cameras.

It is important to note that the optical sensors are advantageously arranged in a substantially regular manner along the spray boom. However, the optical sensors generally have a variation in positioning between them. This is partly due to the positioning uncertainties that are often present, in particular due to the mechanical uncertainties in the positioning of the spray boom, in particular the jib and the angular deviations of the spray boom. To this is added, when the spray boom is potentially retracted, the management of the bulk generated by the optical sensors. Indeed, the optical sensors should not obstruct the retraction of the spray boom. Thus, the optical sensors are generally positioned with a variable gap between adjacent optical sensors. This variability leads to the need to carry out an individual calibration of each of the optical sensors. It is consequently important to carry out a fast and accurate calibration, as allowed by the present invention.

Further, with reference to FIG. 2, the agricultural spraying machine 100 may also comprise at least one light source 180, preferably a plurality of light sources, in order to illuminate the plot to be treated, notably at night but also during the day in low light conditions. Indeed, shadows reduce the quality of the acquired images, which leads to a consequence on the performance of the spraying method. Thus, adequate illumination of the plot to be treated makes it possible to improve the quality of the images acquired by the optical sensors, which then facilitates the processing of the acquired images. The light sources may for example comprise laser sources or white sources, or a combination of laser sources and white sources.

The light sources may also be arranged at the level of the optical sensors, or even be integrated into the optical sensors, so as to limit the effects of shadows induced by the light sources in the field of view of the corresponding sensors.

The light sources may in particular be oriented mainly along an axis close to the axis of the associated optical sensor, and thus provide more homogeneous illumination of the plot to be treated for the corresponding optical sensor. Alternatively, the light sources may comprise projectors, being separate elements from the optical sensors, and installed on the spray boom.

In addition, the light sources 180 may be configured to project light patterns onto the ground. The agricultural spraying machine 100 may then comprise a concentration device 181 associated with the corresponding light source 180, the concentration device 181 being configured to focus the light emitted by the corresponding light source 180. Indeed, by focusing the light coming from the light sources, it becomes possible to generate light patterns.

Furthermore, parameters of the light sources may advantageously be adjustable, for example the light intensity of the light sources may be variable. Then, the control unit may be configured to control the light sources, for example to switch on, switch off, or to adjust said light source parameters, in order to provide optimal illumination of the plot to be treated. In particular, the control unit may control the light sources in order to project the light patterns when appropriate.

Figure 4:
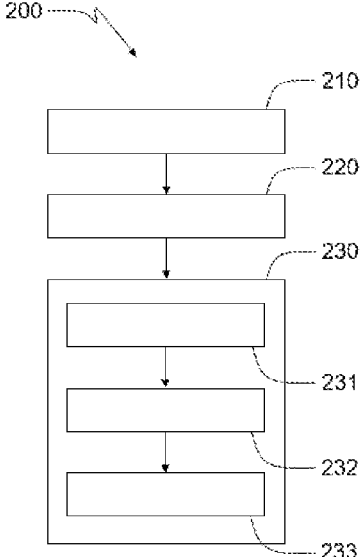
FIG. 4 is a schematic representation of the method for calibrating the agricultural spraying machine according to one embodiment of the invention.

FIG. 4 schematically illustrates the calibration method 200 of the agricultural spraying machine described previously according to another aspect of the invention. The calibration method 200 according to this aspect of the invention comprises, for a given optical sensor 130, an automatic association 230 of each sector 132 of the field of view 131 of the corresponding optical sensor 130 with a spray nozzle of the plurality of spray nozzles 120 or, where applicable, to a multi-nozzle assembly. Thus, the invention makes it possible to make the connection between the field of view of the corresponding optical sensor and the spray field of the associated spray nozzles, and does so in an automated manner.

The automatic association 230 is implemented by the control system 140 of the agricultural spraying machine. In particular, the control system may comprise a third control unit configured to implement at least the automatic association step 230 of the calibration method 200 according to the invention.

The present invention, by implementing an automatic association of the sectors of the field of view of the optical sensors with the spray nozzles, provides the considerable advantage of simplifying the commissioning of the agricultural spraying machine and reducing the duration of the calibration operation, in particular in comparison with a manual calibration of the agricultural spraying machine.

Also, the invention enables each of the sectors of the field of view of the corresponding optical sensor to be precisely associated with a corresponding spray nozzle. Consequently, the calibration method according to the invention enables a better predictability of the calibration operation, and consequently improves the efficiency of the method for localized spraying of the agricultural spraying machine during operation.

As a reminder, the mechanical positioning of the different elements of the agricultural spraying machine, in particular the optical sensors, and the spray nozzles, may be variable. This variability is due to space constraints of the spraying system and positioning uncertainties, notably linked to the jib and to the angular deviations of the spray boom, which may vary over time. The invention makes it possible to improve the adjustment of the control system, despite the variations in the positioning of the optical sensors on the spray boom, and consequently contributes to improving the localized and automatic spraying method.

The calibration method according to the invention may be repeated for all the optical sensors of the agricultural spraying machine. This is notably the case when the agricultural spraying machine is initially calibrated, for example in the factory, before the agricultural spraying machine is put into service for the first time.

The calibration method according to the invention may also be performed for only one of the optical sensors 130, for example during a maintenance operation of the corresponding optical sensor, or following an identification of an incorrect adjustment associated with the corresponding optical sensor.

Then, the calibration method 200 according to the invention may advantageously comprise the automatic identification by the control system 140 of an incorrect adjustment associated with one of the optical sensors 130, prior to the step of automatic association 230 implemented by the control system 140 for the corresponding optical sensor 130.

For example, in order to verify whether the field of view of one of the optical sensors has deviated since the last calibration operation associated with the optical sensor in question, it may be envisaged to arrange a distinctive element on the agricultural spraying machine that is within the field of view of the corresponding optical sensor. The distinctive element may for example be a QR code. Then, if the position of the distinctive element in the field of view of the corresponding optical sensor has too great a variation, an incorrect adjustment associated with this optical sensor will be able to be identified. The distinctive element may for example only appear in the field of view of the optical sensor when the spray boom is in the retracted position. The distinctive element will then be able to be arranged on the spray boom. The verification of the deviation of the field of view of the corresponding optical sensor will then be able to be carried out when the spray boom is in the retracted position. This advantageously makes it possible to verify whether the association between the sectors of the field of view of the corresponding optical sensor and the spray nozzles is still correct and, if not, to repeat the calibration method for the corresponding optical sensor.

According to another example, the calibration method 200 according to the invention may comprise the verification of the overlap of fields of view 131 of two consecutive optical sensors 130. If this overlap has changed with respect to the last calibration operation of the corresponding optical sensor, then the calibration method will be able to be performed again for the corresponding optical sensor.

Furthermore, it is also possible to automatically associate the sectors of the field of view of a given optical sensor with the spray nozzles, using overlapping areas between adjacent optical sensors 130. The optical sensors will then be able to be adjusted with respect to the adjacent optical sensors.

Thanks to the overlapping areas, it is furthermore possible to determine whether an optical sensor has moved, provided that the reference system 300 extends notably into said overlapping areas between adjacent optical sensors 130, making it possible to launch a calibration procedure only for the optical sensor having moved.

The calibration method 200 according to the invention will be described in more detail only for one of the optical sensors for the sake of simplification. Preferably, the calibration method 200 according to the invention may comprise, for the corresponding optical sensor 130, performing the following successive steps:

the placing 210 of a reference system 300 in the field of view 131 of the corresponding optical sensor 130. The reference system 300 may preferably be arranged at ground level. In addition, the reference system 300 has a plurality of patterns 310 (represented by solid lines in FIG. 3), each of the patterns 310 being associated with one of the spray nozzles 120 and corresponding to an offset position of the corresponding spray nozzle 120, in particular along the forward direction of the agricultural spraying machine; a pattern 310 may be visible not only by the optical sensor 130 with which it is associated, but also, at least in part, by the adjacent optical sensor(s) 130;

the acquisition 220 by the corresponding optical sensor 130 of an image of said field of view 131 integrating said plurality of patterns 310.

the automatic association 230 implemented by the control system 140 comprising the detection 232 of said plurality of patterns 310 on said image, followed by the association 233 of each of the sectors 132 of the field of view 131 with one of the spray nozzles 120 when the corresponding sector 132 integrates at least partially the pattern 310 associated with the corresponding spray nozzle 120.

The calibration method 200 thus makes it possible to estimate the position of the optical sensor 130 with respect to the spray nozzles 120 by determining the position of the reference system 300 with respect to said spray nozzles 120.

The reference system 300 may for example have patterns 310 of the line or grid type (as represented in FIG. 3) or even more complex shapes, such as a checked pattern or any suitable pattern, whether symmetrical or not. Thus, the reference system 300 is for example a sight.

In the case where the reference system 300 has a grid-shaped pattern notably, then each horizontal line corresponds to an offset position of a spray nozzle, or where applicable a multi-nozzle assembly, along the forward direction of the agricultural spraying machine (represented by a solid arrow in FIG. 3).

More generally, the position and the orientation of a pattern of the reference system 300 with respect to the spray nozzles 120 makes it possible to determine relative positions of the reference system 300, for example a sight, spray nozzle 120 and optical sensor 130, making it possible to estimate a local position, in other words relative position, of the optical sensor 130 with respect to the spray nozzles and next the position of the pattern of the reference system 300 with respect to the spray nozzles 120.

Furthermore, the sectors 132 (grid with dashed lines in FIG. 3) of the field of view 131 of the corresponding optical sensor 130 may be offset with respect to the patterns 310 (grid with solid lines in FIG. 3) of the reference system 300. For example, the patterns 310 of the reference system 300 may be longitudinal lines along the forward direction of the agricultural spraying machine in the extension of the spray nozzles. Then, the sectors associated with each spray nozzle, or where applicable with each multi-nozzle assembly, include the corresponding longitudinal line, and therefore may overlap on either side of the corresponding longitudinal line.

It is important to know the relative positioning between the spray nozzles 120 and the reference system 300. To do so, it is preferable to adapt the position of the reference system 300 with respect to the spray nozzles, the reference system 300 being able to be repositioned more easily. But the opposite is also possible, namely adapting the position of the spray nozzles 120 with respect to the reference system

300 considered as fixed. However, repositioning the spray nozzles 120 along the spray boom 150 is generally a more cumbersome operation.

According to one embodiment of the invention, the reference system 300 may be a physical system, notably a tarpaulin. Then, the placing 210 of the reference system 300 comprises the placing of the physical system at a given distance from the spray boom 150 by an operator.

In particular, the tarpaulin may be positioned with respect to the spray boom, by means of mechanical connections 320 (illustrated by dotted lines in FIG. 3), for example cords or cables, or instead other more rigid connections.

In addition, the automatic association 230 implemented by the control system 140 for the corresponding optical sensor 130, may advantageously comprise the detection 231 of the contour of the tarpaulin prior to the detection of said plurality of patterns 310 of the reference system 300 on said image of the field of view 131 of the corresponding optical sensor 130. This step makes it possible to obtain information on the perspective of the field of view of the corresponding optical sensor with respect to the ground.

Further, according to another embodiment of the invention, the reference system 300 may also be shifted with respect to the ground. For example, the reference system 300 may be arranged on a surface closer to the optical sensor, positioned between the optical sensor and the ground. In other words, the reference system is projected onto the corresponding surface. It may also be envisaged to mount this type of reference system on a mechanical support, for example mechanically linked with the spray boom, so as to be able to more easily manage the positioning of the reference system with respect to the spraying system. In addition, using a reference system on a projected surface, closer to the optical sensor and therefore of smaller dimensions, makes it possible to reduce the bulk required to calibrate the agricultural spraying machine.

According to another embodiment of the invention, the agricultural spraying machine comprises light sources 180, as described previously. Then, the placing 210 of the reference system 300 comprises in particular the projection of the plurality of patterns 310 by the light sources 180 onto the ground, said plurality of patterns 310 then corresponding to light patterns. The light sources 180 may for example be laser sources. In addition, the light patterns may form lines or instead form a grid. Using light patterns makes it possible to do without the need for a physical system, which is typically more bulky and takes longer to put in place.

To summarize, the invention makes it possible for the control system to automatically link up a subdivision of the field of view of the cameras and the spray nozzles. This considerably facilitates the commissioning of agricultural sprayers carrying out automatic localized spraying. In addition, the operations of maintenance of such agricultural sprayers are also facilitated.

When the reference system is visible by two different optical sensors 130, in particular adjacent sensors, it is possible to determine the relative position of one optical sensor with respect to the other. Thus, thanks to the invention, it is possible to determine the position of the spray nozzles 130 and the optical sensors 120 with respect to the spray boom 150 and to the agricultural spraying machine 100 as a whole. In other words, thanks to the calibration method 200 according to the invention, it is possible to determine the position of the spray nozzles 130 and the optical sensors 120 in a frame of reference of the agricultural spraying machine 100.

The invention claimed is:

1. A calibration method of an agricultural spraying machine comprising a spraying system comprising a spray boom, a plurality of spray nozzles arranged on the spray boom one or more optical sensors, and a control system, each of the one or more optical sensors having a field of view comprising sectors forming a grid, each cell of the grid of each sector being associated with a spray nozzle of the plurality of spray nozzles, each of the spray nozzles associated with one or more cells of the grid, the control system being configured to process acquired images of the field of view of each of said one or more optical sensors and to control the plurality of spray nozzles as a function of said images, the calibration method comprising, for each optical sensor, using the control system to automatically associate each sector of the field of view with at least one of the plurality of spray nozzles.

2. The calibration method according to claim 1, wherein for each of the one or more optical sensors, performing the following successive steps:

placing a ground reference system in the field of view of the optical sensor, the ground reference system having a plurality of patterns, each of the patterns being associated with at least one of said plurality of spray nozzles and correspond to an offset position of the at least one spray nozzle;

integrating said plurality of patterns with at least one of the images of the field of view acquired by said at least one optical sensor;

wherein the automatic association implemented by the control system comprising the detection of said plurality of patterns in said image, followed by the association of each of the sectors of the field of view with one of the spray nozzles of said plurality of spray nozzles when the corresponding sector at least partially integrates the plurality of patterns.

3. The calibration method according to claim 2, the ground reference system being a physical system, characterized in that the placing of the ground reference system comprises the placing of the physical system at a given distance from the spray boom by an operator.

4. The calibration method according to claim 3, the physical system being a tarpaulin, characterized in that automatic association implemented by the control system for a corresponding optical sensor comprises the detection of a contour of the tarpaulin prior to the detection of said plurality of patterns of the ground reference system on said image of the field of view of the corresponding optical sensor.

5. The calibration method according to claim 2, the agricultural spraying machine comprising at least one light source, characterized in that the implementation of the ground reference system comprises the projection of the plurality of patterns by said at least one light source onto the ground, said plurality of patterns corresponding to light patterns.

6. The calibration method according to claim 1, wherein the association step is performed for each of the one or more optical sensors.

7. The calibration method according to claim 1, wherein the association step is performed for only one optical sensor of the one or more optical sensors, notably following an identification of an incorrect adjustment associated with the corresponding optical sensor.

8. The calibration method according to claim 1, comprising the automatic identification by the control system of an incorrect adjustment associated with an optical sensor of the plurality of optical sensors, prior to the automatic association implemented by the control system for the corresponding optical sensor.

9. The calibration method according to claim 1, comprising the verification of the overlap of fields of view of two consecutive optical sensors of the plurality of optical sensors, prior to the automatic association implemented by the control system for the corresponding optical sensor.

10. The calibration method according to claim 9, wherein a pattern associated with a spray nozzle extends at least partially into the field of view of at least two adjacent optical sensors.

11. An agricultural spraying machine comprising a spraying system comprising a spray boom, a plurality of spray nozzles arranged on the spray boom, a plurality of optical sensors, and a control system, each optical sensor of said plurality of optical sensors having a field of view comprising sectors forming a grid, each cell of the grid of each sector being associated with a spray nozzle of the plurality of spray nozzles, each of the spray nozzles being associated with one or more cells of the grid, the control system being configured to process acquired images of the field of view of each of said optical sensors and to control the plurality of spray nozzles as a function of said images, the control system being configured to carry out, for each optical sensor of said plurality of optical sensors, an automatic association between each sector of the field of view of the optical sensor with at least one of the plurality of spray nozzles.

12. The agricultural spraying machine according to claim 11, comprising at least one light source configured to project light patterns onto the ground.

13. The agricultural spraying machine according to claim 12, said at least one light source comprising a concentration device configured to focus the light emitted by the light source.

14. An agricultural spraying machine comprising:

a spraying system comprising a spray boom comprising a frame having a length;

a plurality of spray nozzles arranged along the length of the spray boom, a plurality of optical sensors arranged on the length of the spray boom; and a control system spaced from the spray boom;

each optical sensor of said plurality of optical sensors having a field of view comprising sectors and cells forming a grid;

each of the spray nozzles associated with one or more cells of the grid;

wherein the control system is configured to process acquired images of the field of view of each of said optical sensors and to control the plurality of spray nozzles as a function of said images; and wherein the control system is configured to carry out, for each optical sensor of said plurality of optical sensors, an automatic association between each sector of the field of view of the optical sensor with at least one of the plurality of spray nozzles.

15. The agricultural spraying machine according to claim 14, further comprising at least one light source arranged along the spray boom configured to project light patterns onto the ground.

16. The agricultural spraying machine according to claim 15, wherein said at least one light source comprising a concentration device configured to focus the light emitted by the light source.

17. The agricultural spraying machine according to claim 14, wherein each of the plurality of optical sensors is associated with at least one sector of the field of view of at least one optical sensor and at least one spray nozzle.

18. The agricultural spraying machine according to claim 14, wherein the association follows after an identification of an incorrect adjustment associated with the corresponding optical sensor is performed by the control system.

* * * * *